United States Patent
Schultz et al.

(10) Patent No.: US 8,162,054 B2
(45) Date of Patent: Apr. 24, 2012

(54) METHODS AND APPARATUSES FOR RELEASING A CHEMICAL INTO A WELL BORE UPON COMMAND

(75) Inventors: Roger L. Schultz, Ninnekah, OK (US);
Gary P. Funkhouser, Duncan, OK (US);
Robert Pipkin, Marlow, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 247 days.

(21) Appl. No.: 12/546,345

(22) Filed: Aug. 24, 2009

(65) Prior Publication Data

US 2011/0042082 A1   Feb. 24, 2011

(51) Int. Cl.
*E21B 33/13* (2006.01)
*E21B 17/18* (2006.01)

(52) U.S. Cl. .......... 166/285; 166/166; 166/241.6; 166/242.5; 166/300; 166/376; 166/386

(58) Field of Classification Search .......... None
See application file for complete search history.

(56) References Cited

U.S. PATENT DOCUMENTS

| | | | |
|---|---|---|---|
| 4,361,187 A | 11/1982 | Luers | |
| 5,533,570 A | 7/1996 | Streich et al. | |
| 5,544,705 A | 8/1996 | Jones et al. | |
| 5,697,442 A | 12/1997 | Baldridge | |
| 5,718,287 A | 2/1998 | Streich et al. | |
| 6,390,196 B1 | 5/2002 | Montaron et al. | |
| 6,431,282 B1 | 8/2002 | Bosma et al. | |
| 7,004,260 B2 | 2/2006 | Bosma et al. | |
| 7,303,014 B2 | 12/2007 | Reddy et al. | |
| 7,404,440 B2 | 7/2008 | Reddy et al. | |
| 7,409,991 B2 | 8/2008 | Reddy et al. | |
| 7,451,817 B2 | 11/2008 | Reddy et al. | |
| 7,546,878 B2 | 6/2009 | Prado et al. | |
| 2004/0084186 A1* | 5/2004 | Allison | 166/305.1 |
| 2008/0093077 A1 | 4/2008 | Daccord et al. | |
| 2008/0149335 A1 | 6/2008 | Lee | |
| 2009/0294133 A1 | 12/2009 | Shindgikar et al. | |
| 2011/0132606 A1 | 6/2011 | Demong et al. | |

OTHER PUBLICATIONS

International Search Report and Written Opinion for PCT/GB2010/001592, dated Apr. 21, 2011.
Office Action in U.S. Appl. No. 12/546,335, Dec. 5, 2011.

* cited by examiner

*Primary Examiner* — Zakiya W Bates
(74) *Attorney, Agent, or Firm* — John W. Wustenberg; Baker Botts LLP

(57) ABSTRACT

One apparatus for releasing a chemical in a well bore includes a casing collar configured to couple to a casing string. A chemical container is disposed within the casing collar, and the casing collar is configured to release the chemical from the chemical reservoir.

11 Claims, 13 Drawing Sheets

FIG.2b

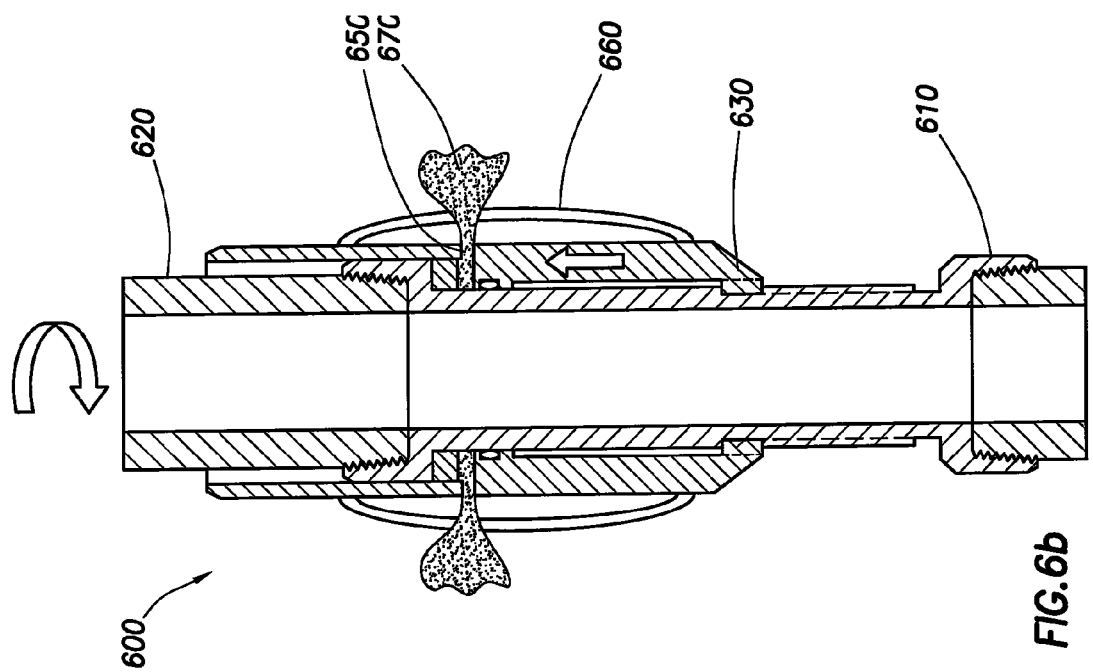
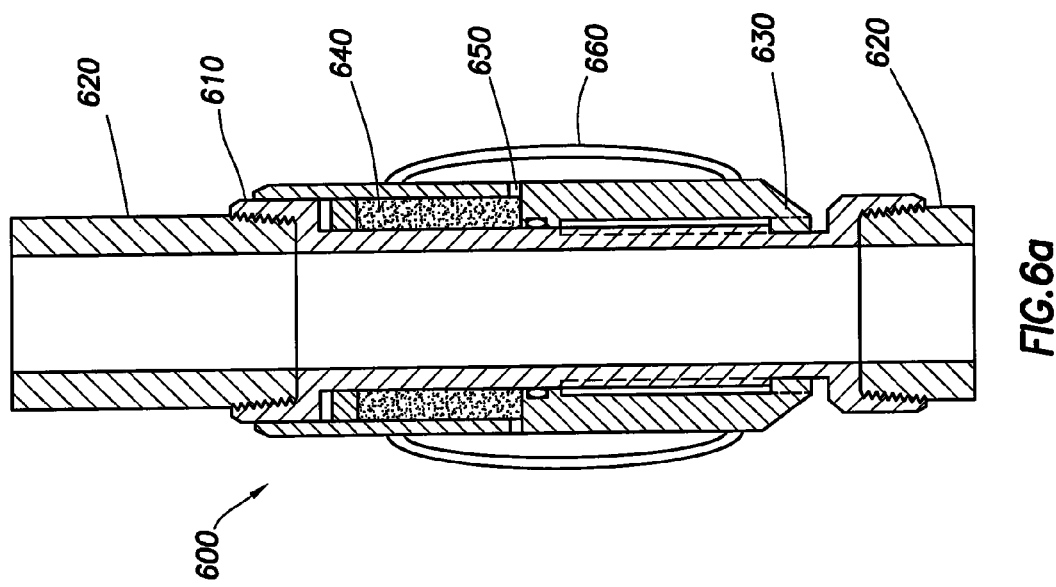
FIG. 6a
FIG. 6b

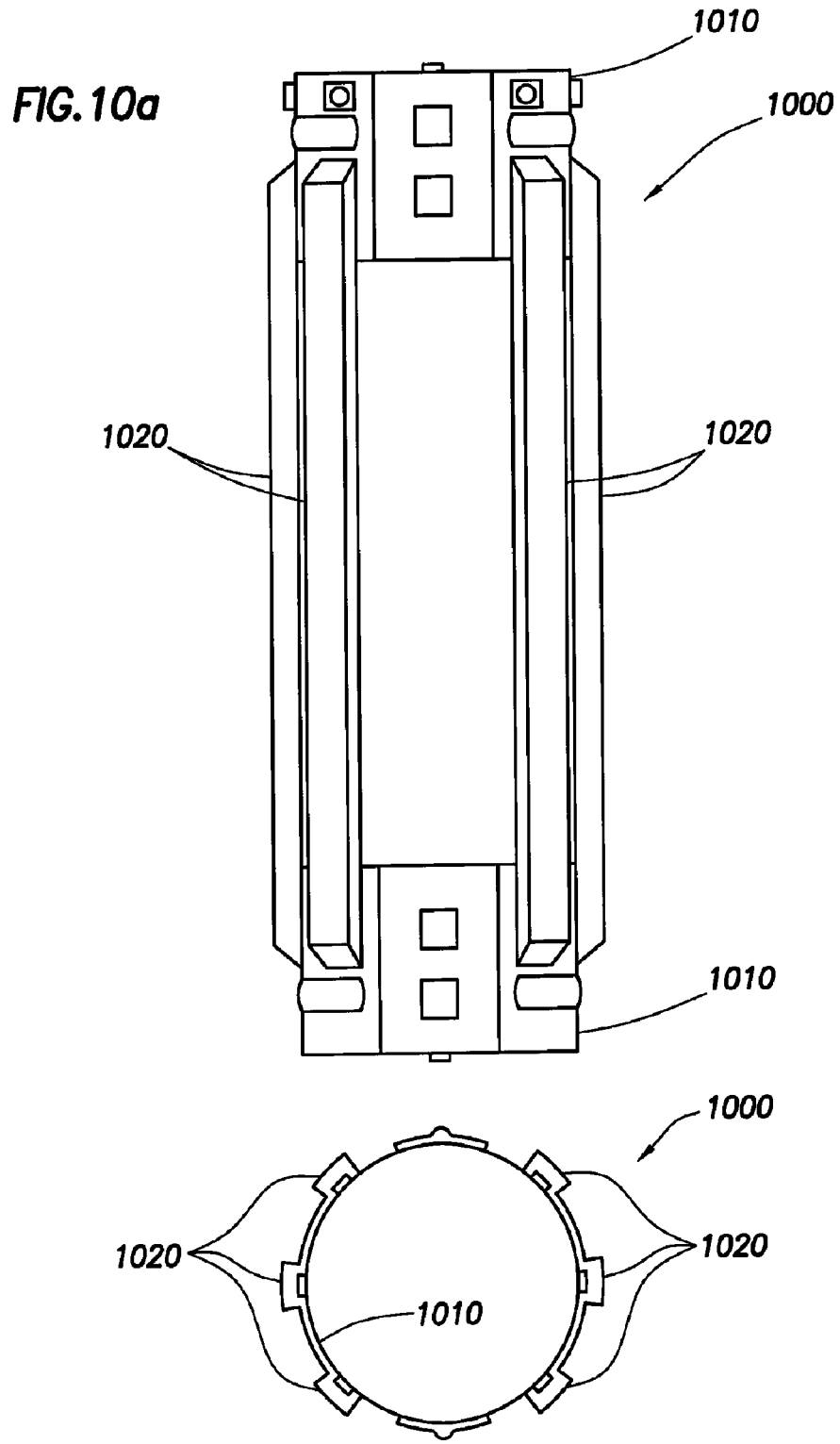

METHODS AND APPARATUSES FOR RELEASING A CHEMICAL INTO A WELL BORE UPON COMMAND

CROSS-REFERENCE TO RELATED APPLICATIONS

The present application is related to co-pending U.S. application Ser. No. 12/546,335, entitled "Methods and Apparatuses for Releasing a Chemical into a Well Bore Upon Command," filed concurrently herewith, the entire disclosure of which is incorporated herein by reference.

BACKGROUND

The present disclosure relates to well bore operations, and, more particularly, to methods and apparatuses for releasing a chemical into a well bore upon command.

Settable compositions such as cement slurries may be used in primary cementing operations in which pipe strings, such as casing and liners, are cemented in well bores. In performing primary cementing, a cement may be pumped, for example, through the casing into an annulus between the walls of a well bore and the casing disposed therein. The cement may be pumped into the annulus until it reaches a predetermined height in the well bore to provide zonal isolation. The cement may cure in the annulus, thereby forming an annular sheath of hardened cement (e.g., a cement sheath) that supports and positions the pipe string in the well bore and bonds the exterior surface of the pipe string to the walls of the well bore.

In many applications, it may be desirable to have a deployment means to release one or more chemicals into the annulus between the well bore and the casing so that the chemical need not be pumped from the surface at the top of the well bore. Moreover, in the case of cementing operations, it may be desirable to not activate a cement composition in the annulus until a specific time chosen by an operator. Providing such a deployment means may entail a number of complications such as complex and expensive equipment and procedures. Therefore, it may be desirable to have methods and apparatuses for chemical deployment that are inexpensive, not complex, and require minimal modification to existing procedures such as cementing procedures.

SUMMARY

The present disclosure relates to well bore operations, and, more particularly, to methods and apparatuses for releasing a chemical into a well bore upon command.

A method for releasing a chemical in a well bore is disclosed. In one aspect, a casing string is provided, and the casing string includes a casing collar that includes a chemical reservoir. A fluid is introduced into a space between an inner surface of the well bore and an outer surface of the casing string. A chemical is released from the chemical reservoir into the fluid.

An apparatus for releasing a chemical in a well bore is disclosed. In one aspect, the apparatus includes casing collar configured to connect to a section of a casing string. A chemical container is disposed within the casing collar, and the casing collar is configured to release a chemical from the chemical reservoir.

A method for releasing a chemical in a well bore is disclosed. In one aspect, an activator collar is connected between sections of a casing string. The activator collar and the sections are positioned in a well bore. A non-activated cementitious material is introduced into the well bore. A chemical is released from the chemical reservoir into the well bore.

The features and advantages of the present disclosure will be readily apparent to those skilled in the art. While numerous changes may be made by those skilled in the art, such changes are within the spirit of the invention.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

FIGS. 6a and 6b illustrate cross-sectional views of casing and a casing collar in accordance with certain embodiments of the present disclosure.

FIGS. 10a and 10b illustrate side and axial views of a centralizer in accordance with certain embodiments of the present disclosure.

DESCRIPTION OF PREFERRED EMBODIMENTS

Figure 1:
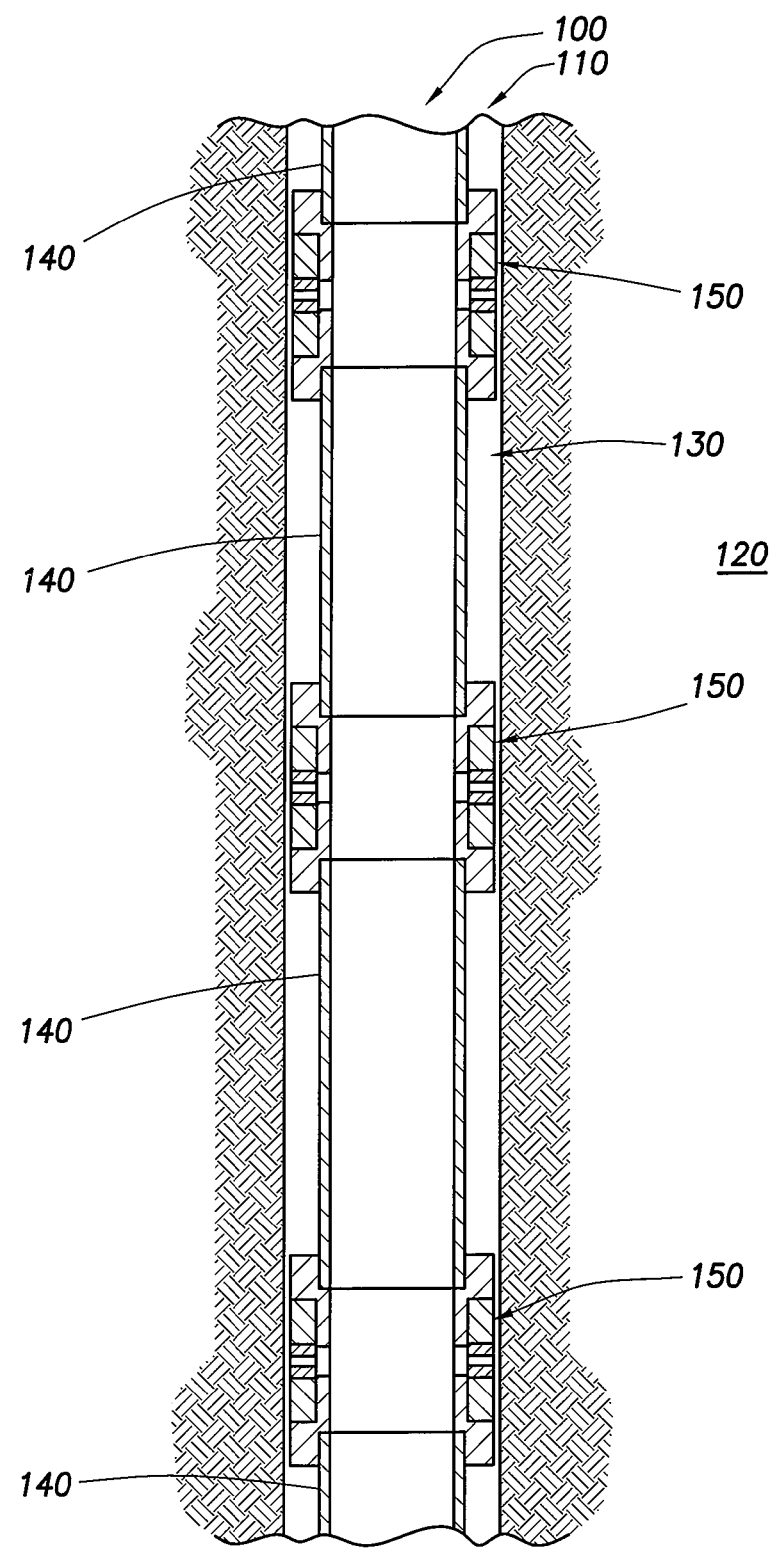
FIG. 1 illustrates a cross-sectional view of a casing string in accordance with certain embodiments of the present disclosure.

The present disclosure relates to well bore operations, and, more particularly, to methods and apparatuses for releasing a chemical into a well bore upon command. Stated otherwise, the present disclosure may allow an operator to choose a specific time at which one or more chemicals may be released into an annulus. In certain embodiments of the present disclosure, the subterranean well fluids useful in the present disclosure may be permitted to remain in a slurry state for a desired time before being activated through the addition of an activator released from an improved casing string.

One application of the present disclosure relates to well bore cementing operations. Typically, a cementing operation involves introducing a casing string into a well bore. A cement composition may then be pumped down the interior of the casing string, with a bottom plug and a top plug installed so that a cement column may be placed in between the plugs. A displacement fluid may push the cement column and plugs down the well bore. The bottom plug may then be landed and pump pressure may cause a frangible element within the bottom plug to rupture, allowing the cement in the casing to be pumped through the bottom plug and a float shoe, and then up into the annular space between the casing and the well bore. When all the cement has been pumped through the bottom plug the top plug may land on the bottom plug. As an alternative to the above cementing operation, cement may be placed into the annulus by what is known in the art as a reverse cementing operation. In either case, as the placed cement sets, it bonds the casing string to a portion of the subterranean formation.

In certain embodiments of the present disclosure, a cementitious material placed in the annulus may be non-activated. Thereafter, an operator may initiate the setting of the cementitious material "on-command" by choosing a specific time at which to release an activation agent into the non-activated cementitious material. The moment of initiation may be chosen any time after cementitious material is in place within the well bore.

A wide variety of fluids may be useful with the methods of the present disclosure. One of ordinary skill in the art, with the benefit of this disclosure, will be able to identify a suitable fluid for use in the methods of the present disclosure. In certain embodiments, the subterranean well fluids used in the present disclosure include a hydraulic cement. A variety of hydraulic cements may be suitable for use including those comprising calcium, aluminum, silicon, oxygen, and/or sulfur, which may set and harden by reaction with water. Such hydraulic cements include, but are not limited to, Portland cements, pozzolanic cements, gypsum cements, high alumina content cements, silica cements, and high alkalinity cements. Cementitious material comprising shale or blast furnace slag, fly ashes, and fumed silica also may be suitable for use in the present disclosure. In certain embodiments, the shale may include vitrified shale; in certain other embodiments, the shale may include raw, unfired shale, or a mixture of raw shale and vitrified shale.

In certain embodiments, cement hydration may be activated with conventional cement accelerators. The activator may include but is not limited to sodium hydroxide, sodium carbonate, amine compounds, salts comprising calcium, sodium, magnesium, aluminum, and/or mixtures thereof. One of ordinary skill in the art, with the benefit of this disclosure, will be able to identify a suitable activating material to accelerate the setting of a cement slurry. In some embodiments, the activator may comprise a calcium salt such as calcium chloride. In some embodiments, the activator may comprise a sodium salt such as sodium chloride, sodium aluminate, and/or sodium silicate. In some embodiments, the activator may comprise a magnesium salt such as magnesium chloride. In some embodiments, the activator may comprise amine compounds such as triethanol amine, tripropanol amine, tri-isopropanol amine, and/or diethanol amine. In some embodiments, the activator will be released in a sufficient amount to set the cement within about 1 minute to about 24 hours. In embodiments including sodium chloride as the released activator, the concentration may be in the range of from about 3% to about 15% by weight of the cement in the cement slurry. In embodiments including calcium chloride as the released activator, the concentration may be in the range of from about 0.5% to about 5% by weight of the cement in the cement slurry.

In some embodiments, the activator may "flash-set" the cement slurry. As referred to herein, the term "flash-set" will be understood to mean the initiation of setting of the cement slurry within about 1 minute to about 15 minutes after contacting the released activator. In some embodiments, the previously identified activators may flash set the cement slurry. Flash-set activators may include sodium hydroxide, sodium carbonate, potassium carbonate, bicarbonate salts of sodium or potassium, sodium silicate salts, sodium aluminate salts, ferrous and ferric salts (e.g., ferric chloride and ferric sulfate), polyacrylic acid salts, and/or others. In some embodiments, the following activators can flash-set the cement slurry based on these activators exceeding a specified concentration: calcium nitrate, calcium acetate, calcium chloride, and/or calcium nitrite.

In alternative embodiments, a strongly-retarded cement may be activated by degrading the retarder with an oxidizing agent. Suitable oxidizing agents may be either inorganic (e.g., sodium persulfate, sodium bromate, sodium chlorate) or organic (e.g., di-t-butyl peroxide, dicumyl peroxide, t-butyl hydroperoxide), depending on the temperature and type of retarder used. Any suitable activation system which may be deployed in the manner described herein may be used.

FIG. 1 shows cross-sectional view of an exemplary embodiment of casing string 100 inserted into well bore 110 after well bore 110 has been drilled to a desired depth below the surface into subterranean formation 120. Annulus 130 may be formed between casing string 100 and subterranean formation 120. Casing string 100 may include a series of interconnected sections of casing 140. These sections of casing 140 may be connected by activation collars 150. Activation collars 150 may be placed in casing string 100 and cemented in a manner similar to that used with standard casing collars. A casing collar may be configured to be an activation collar 150. Casing string 100 may be positioned in the well bore with activation collars 150 installed between sections of casing 140 at all connections of sections of casing 140. Alternatively, activation collars 150 may be used at one or more selected locations in casing string 100 which may correspond to specific well bore locations in the well once the entire casing string 100 to be cemented has been installed.

When a non-activated cementitious material is placed within a length of annulus 130, a non-activated condition may be maintained for a long period of time with no setting of the material. If complications are encountered in completing cementing operations, there may be no danger of the cement setting during this non-activated condition, thereby possibly eliminating major remediation or causing loss of the well due to having hardened cement where it is not desired. Once an operator decides to "activate" the cementitious material to cause it to set, or otherwise release a chemical into the annulus, additional pressure may be applied to displacement fluid within casing string 100. The additional pressure may be communicated to an activation collar 150. Activation collar 150 may be configured to release one or more chemicals in response to a pressure increase in the casing string 100. To facilitate chemical dispersion, casing string 100 may be rotated and/or reciprocated axially along well bore 110. The rotation and/or reciprocation may be concurrent with, or subsequent to, the chemical release.

Figure 2B:
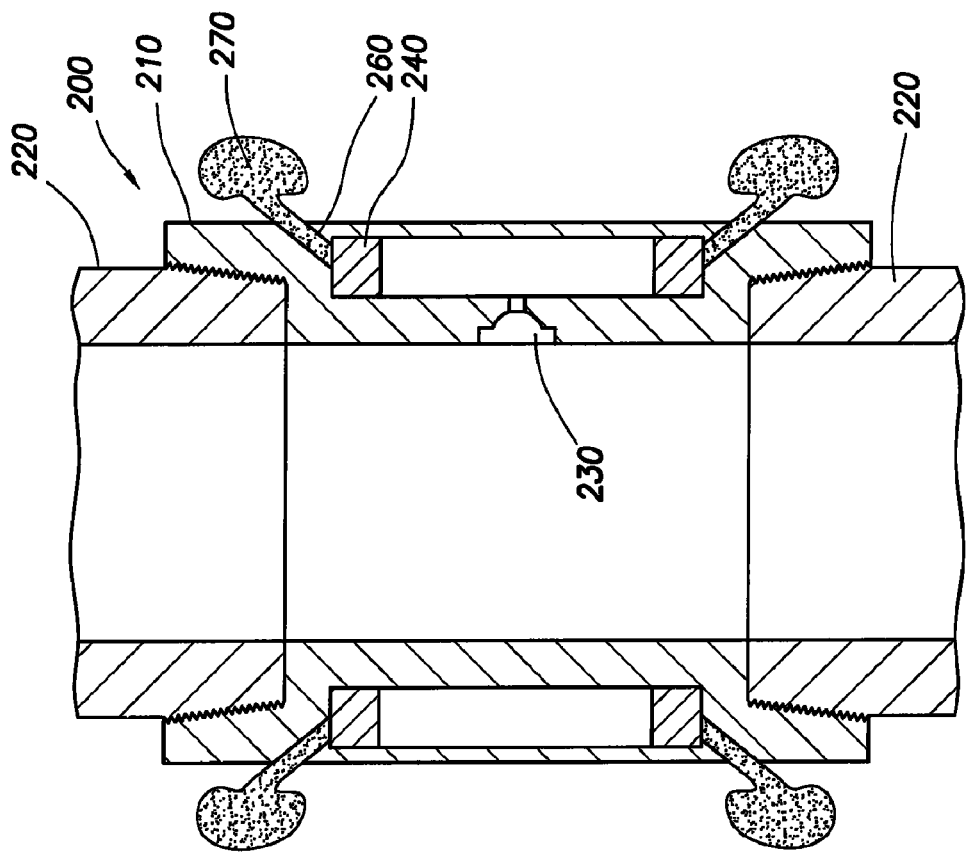
FIGS. 2a and 2b illustrate cross-sectional views of casing and a casing collar in accordance with certain embodiments of the present disclosure.
Figure 2A:
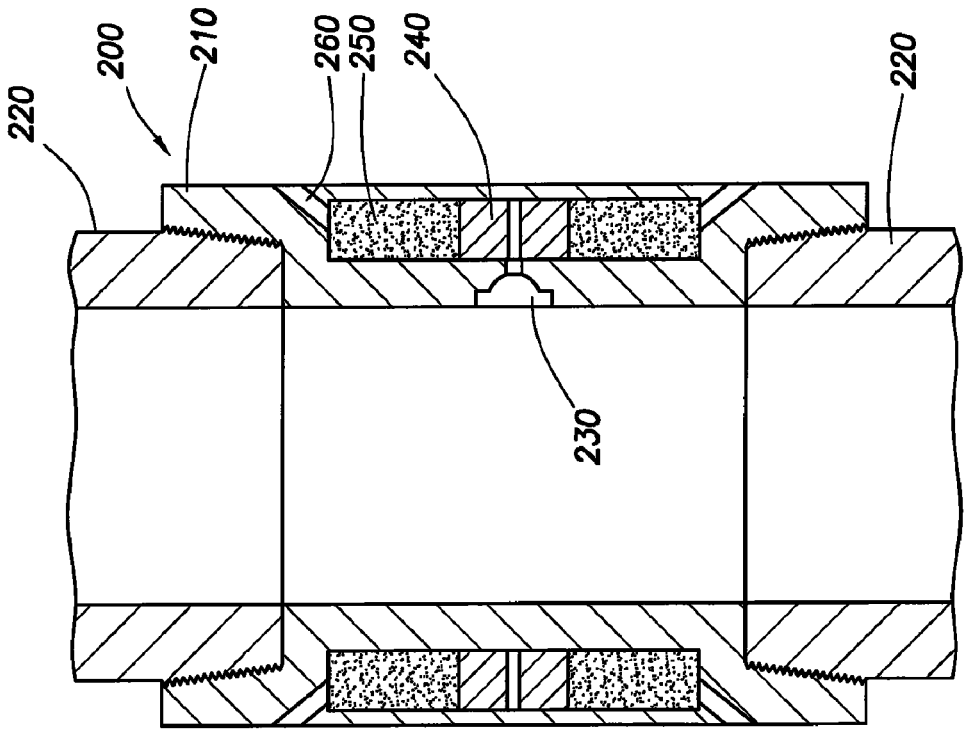

FIG. 2a illustrates a cross-sectional view showing details of an exemplary activation collar 200, corresponding to activation collars 150 in FIG. 1, before operation. Activation collar 200 may include a hollow, generally cylindrically shaped housing 210. Generally, the activation collars disclosed herein may be manufactured, depending upon the particular use, from a variety of materials used for conventional casing collars, including, but not limited to, ferrous materials, aluminum, titanium, and/or fiberglass.

Activation collar 200 may further include collar threading on one or more surfaces of housing 210 as means of connecting to casing threading of sections of casing 220. It should be understood by those skilled in the art that, in certain embodiments of the present disclosure, alternative means of connecting to sections of casing 220 may be employed. Generally, conventional sections of casing disclosed herein, depending upon the particular use, may be manufactured from a variety of materials, including, but not limited to, ferrous materials, aluminum, titanium, and/or fiberglass.

Housing 210 may include one or more rupture elements 230. Rupture element 230 may be, for example, a rupture disk or other frangible element configured to mechanically break down or otherwise allow fluid communication in response to a given pressure on an interior surface of housing 210. Rupture element 230 may be configured to rupture at a predetermined pressure.

Housing 210 may further include one or more pistons 240, one or more chemical reservoirs 250, and one or more outlets 260. One or more pistons 240 may be moveable and configured to compress the volume of the chemical reservoir 250 in response to pressure communicated from the interior of housing 210. Chemical reservoir 250 may be any suitable containment of an activation agent. An outlet 260 may be an open port between the chemical reservoir 250 and the exterior of housing 210. Outlet 260 may be appropriately sized such that the pressure balance associated with the exterior of housing 210 prevents the activation agent from exiting the chemical reservoir 250 until piston 240 decreases the volume of chemical reservoir 250 or until its volume is otherwise reduced. Alternatively, outlet 260 may include another sealing element, a wax-like substance, for example, to prevent the activation agent from exiting the chemical reservoir 250 until piston 240 has sufficiently compressed chemical reservoir 250. One of ordinary skill in the art, having the benefit of this disclosure, would understand that a number of substantially equivalent variations of pistons 240, chemical reservoirs 250, and outlets 260 may be employed and which are within the spirit of the present disclosure.

FIG. 2b illustrates a cross-sectional view showing details of exemplary activation collar 200 after rupture element 230 has allowed fluid communication between the interior of housing 210 and piston 240. Piston 240 is shown as having compressed chemical reservoir 250, after activation agent 270 has been expressed through outlet 260 into the annulus. Subsequent or simultaneous rotation and/or reciprocation of the casing string may be used to distribute the activation agent 270 within the fluid in the annulus. Activation collar 200 may also be configured to meter out activation agent 270 slowly, or at any predetermined rate. To facilitate distribution, the casing string may be rotated and/or reciprocated while and/or after the activation agent is released. The casing string may then be positioned in its final desired location before the activator causes the cement to set.

Figure 3:
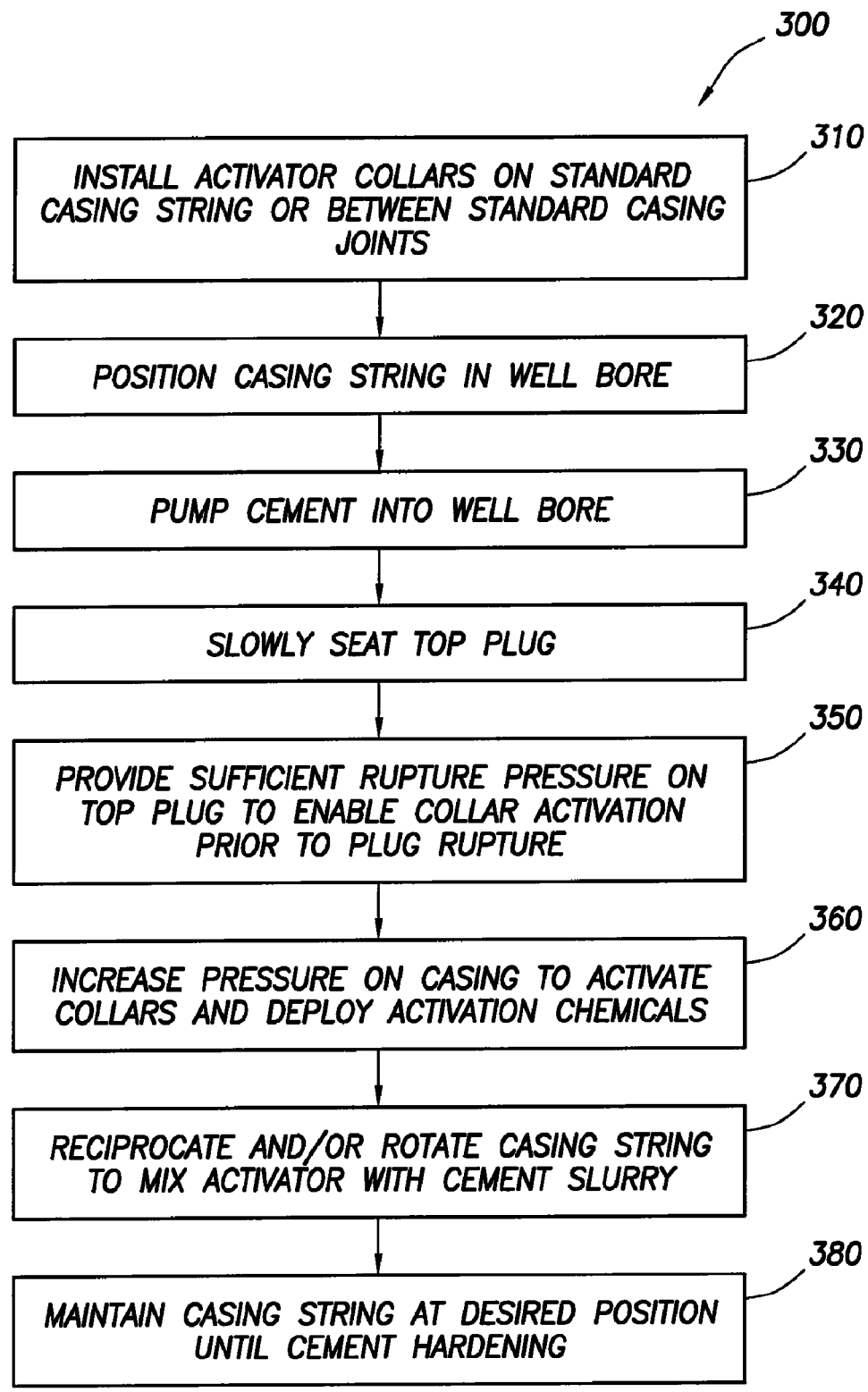
FIG. 3 illustrates a method for bonding a well bore to a casing in accordance with certain embodiments of the present disclosure.

FIG. 3 is a process flow diagram for an exemplary activation collar running procedure 300. In step 310, activation collars may be installed on standard casing, or collars may be installed between standard casing joints, prior to introduction of a cementitious material into the well bore. In step 320, the casing string may be placed into the well bore. In step 330, the cement may be pumped according to standard procedures. In step 340, the top plug may be slowly seated while pumping the cement. In step 350, sufficient rupture pressure on top plug may be provided so that the collars may be activated before plug rupture occurs. In step 360, pressure on the casing may be increased to a level sufficient to activate collars and deploy the activation chemicals. In step 370, the casing string may be reciprocated and/or rotated to mix the activator within the cement slurry. In step 380, the casing string may be positioned and maintained at a desired depth until cement hardening.

Figure 4B:
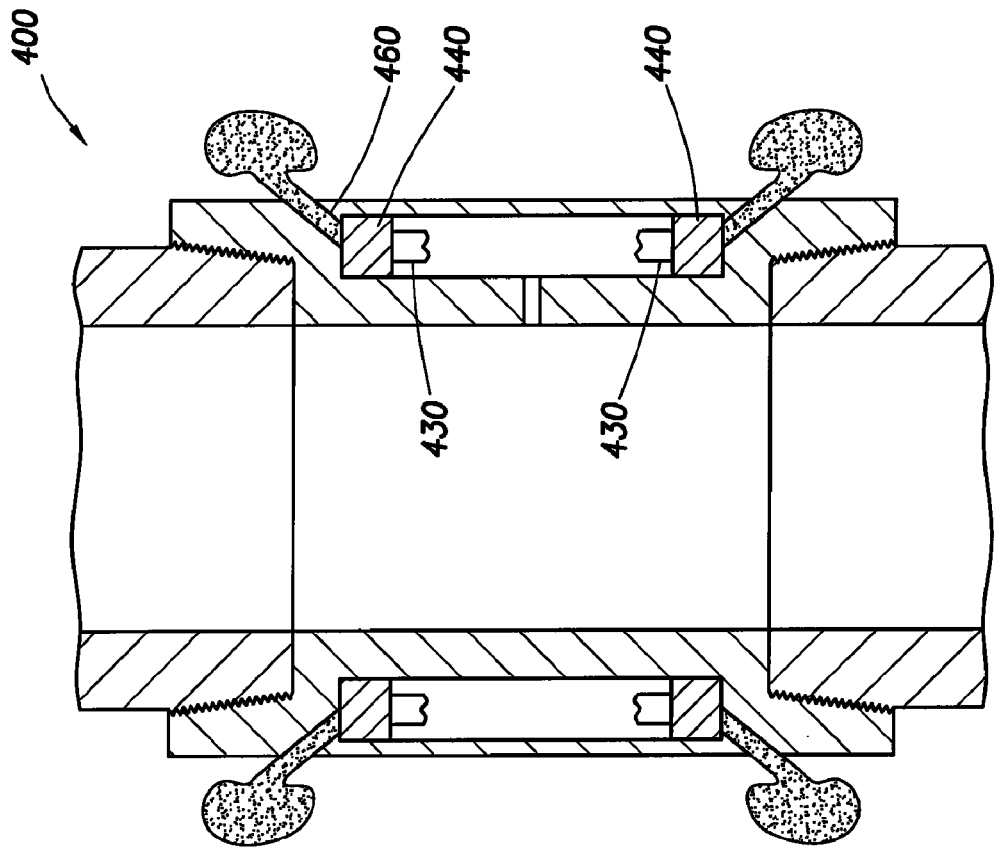
FIGS. 4a and 4b illustrate cross-sectional views of casing and a casing collar in accordance with certain embodiments of the present disclosure.
Figure 4A:
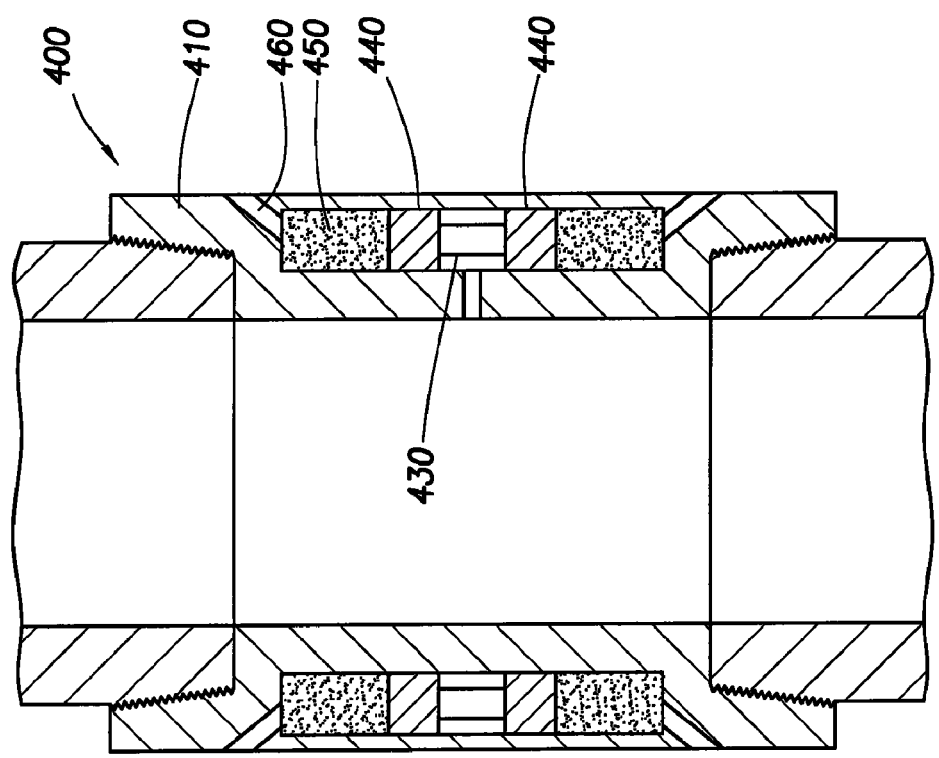

FIGS. 4a and 4b show details of another embodiment of the present disclosure. FIG. 4a illustrates a cross-sectional view showing an exemplary activation collar 400 before activation agent 450 has been expressed through outlet 460 into the annulus. As an alternative to a rupture disk, activation collar 400 may include a tension sleeve 430 that holds two expelling pistons 440 together. When a pressure difference between the interior and the exterior of the casing sufficiently increases, the tensile strength of tension sleeve 430 may be exceeded so that it will break, thereby allowing pistons 440 to force activation agent 450 through port 460 and to the exterior of housing 410. FIG. 4b illustrates activation collar 400 after tension sleeve 430 has given way and allowed activation agent to be expressed through outlet 460 into the annulus.

Thus, in accordance with certain embodiments of the present disclosure, point-distributed activation collars and methods are provided where "doses" of one or more chemicals and/or an activation agent may be introduced at one or more points along a casing string. If necessary, the casing string may be reciprocated and/or rotated to facilitate mixing an activation agent with a fluid in the annulus. Certain embodiments of this invention may eliminate the need for external or internal attachments to a casing string for deployment of an activation agent. Certain embodiments allow for activator distribution within an entire cross-section of an annulus. The equipment and procedures for certain embodiments are not complex, require minimal modification to existing cementing procedures, and have low operating risks.

Figure 5:
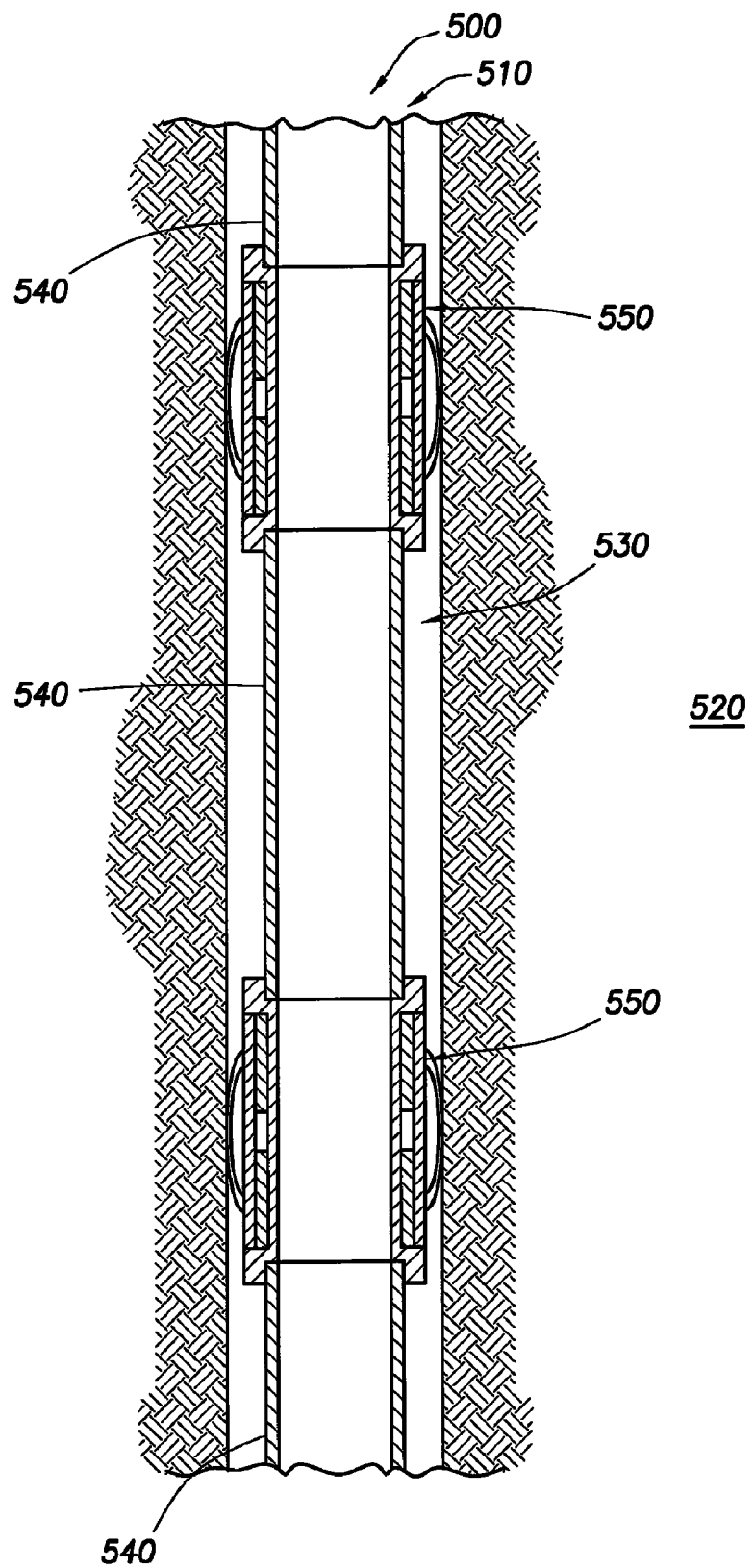
FIG. 5 illustrates a cross-sectional view of a casing string in accordance with certain embodiments of the present disclosure.

FIG. 5 illustrates a cross-sectional view showing another embodiment of the invention. Casing string 500 may be inserted into well bore 510 after well bore 510 has been drilled. Annulus 530 may be formed between casing string 500 and subterranean formation 520. Casing string 500 may include a series of interconnected sections of casing 540. These sections of casing 540 may be connected by activation collars 550. Activation collars 550 may be placed in casing string 500 to be cemented in a manner similar to how standard casing collars would be used. Casing string 500 may be positioned in well bore 510 with activation collars 550 installed between sections of casing 140 at all connections of sections of casing 540. Alternatively, activation collars 550 may be used at one or more selected locations in casing string 500 which correspond to specific well bore locations in well bore 510 once the entire casing string 500 to be cemented is installed.

FIG. 6a illustrates a cross-sectional view showing details of an exemplary activation collar 600, corresponding to the activation collars 550 in FIG. 5, before operation. Activation collar 600 may include an inner housing member 610 coupled to sections of casing 620. Inner housing member 610 may further include collar threading on one or more surfaces of housing 610 as means of connecting to casing threading of sections of casing 620. It should be understood by those skilled in the art that, in certain embodiments of the present disclosure, alternative means of connecting to sections of casing 620 may be employed.

Activation collar 600 may further include an outer housing member 630 coupled to inner housing member 610. Outer housing member 630 may be coupled to inner housing member 610 by a threaded engagement that allows rotational movement and causes the outer housing member 630 to move axially with respect to inner housing member 610. One of ordinary skill in the art, having the benefit of this disclosure, would understand that alternative means of coupling outer housing member 630 to inner housing member 610 may be employed.

A chemical reservoir 640 may be defined by inner housing member 610 and outer housing member 630. Chemical reservoir 640 may be any suitable means of containing one or more chemicals and/or activation agent. Activation collar 600 may be configured so that a relative rotation between inner housing member 610 and outer housing member 630 changes the volume of chemical reservoir 640. One of ordinary skill in the art, having the benefit of this disclosure, would understand that alternative means of disposing a chemical reservoir between an inner housing and an outer housing of a collar may be employed so that the volume of the chemical reservoir may be reduced according to relative rotation between the inner and outer housings.

Activation collar 600 may further include one or more outlets 650. An outlet 650 may be an open port between the chemical reservoir 640 and the exterior of outer housing member 630. Outlet 650 may be appropriately sized such that the pressure balance of associated with the exterior of outer housing member 630 prevents the activation agent from exiting the chemical reservoir 640 until the volume of chemical reservoir 640 is decreased. Alternatively, outlet 650 may include another sealing element, such as a wax-like substance, to prevent the activation agent from exiting the chemical reservoir 650 until chemical reservoir 650 has been sufficiently compressed.

Activation collar 600 may further include one or more bowed spring members-centralizer members 660. Centralizer members 660 may be coupled to outer housing member 630 to allow centralizer members 660 to contact surfaces of the well bore when attached to a casing string downhole. Centralizer members 660 may accordingly provide resistance to rotation so that outer housing member 630 may tend to remain stationary. In alternatives to a bowed spring member, those of ordinary skill in the art would appreciate that a centralizer member 660 may be of another type of projecting member designed to make contact with a surface of a well bore and may not necessarily be designed to provide a centralizing function.

After a non-activated cementitious material has been placed within a length of annulus 530, an operator may decide to "activate" the cementitious material to cause it to set, or otherwise release a chemical into the annulus, by rotating casing string 500. Activation collar 600 may be configured so that a predetermined number of rotations of casing string 500 will actuate activation collar 600 and release an activation agent. Casing string 500 may also be reciprocated axially along well bore 500 to facilitate chemical dispersion. As casing string 500 rotates, centralizer members 660 may make contact with surfaces of the well bore and hold outer housing member 630 stationary, thereby allowing relative rotation between casing string 500 and outer housing member 630. A threaded engagement between outer housing member 630 and inner housing member 610 allows outer housing member 630 to move axially with respect to inner housing member 610. Chemical reservoir 640 accordingly may be reduced in volume due to the axial relative movement, thereby causing an activation agent to be expelled from chemical reservoir 640 into annulus 530.

FIG. 6b illustrates a cross-sectional view showing details of exemplary activation collar 600 after outer housing member 630 has moved axially with respect to inner housing member 610. Outer housing member 630 and inner housing member 610 are shown as having compressed chemical reservoir 640, and activation agent 670 that has been expelled through outlet 650 into the annulus. Concurrent or subsequent rotation and/or reciprocation of casing string 500 may distribute the activation agent 670 within the fluid in the annulus. Activation collar 600 may also be configured to meter out activation agent 670 slowly while the casing string is being rotated and/or reciprocated to facilitate distribution. Casing string 500 may then be positioned in its final desired location before the activator causes the cementitious material to set.

Figure 7:
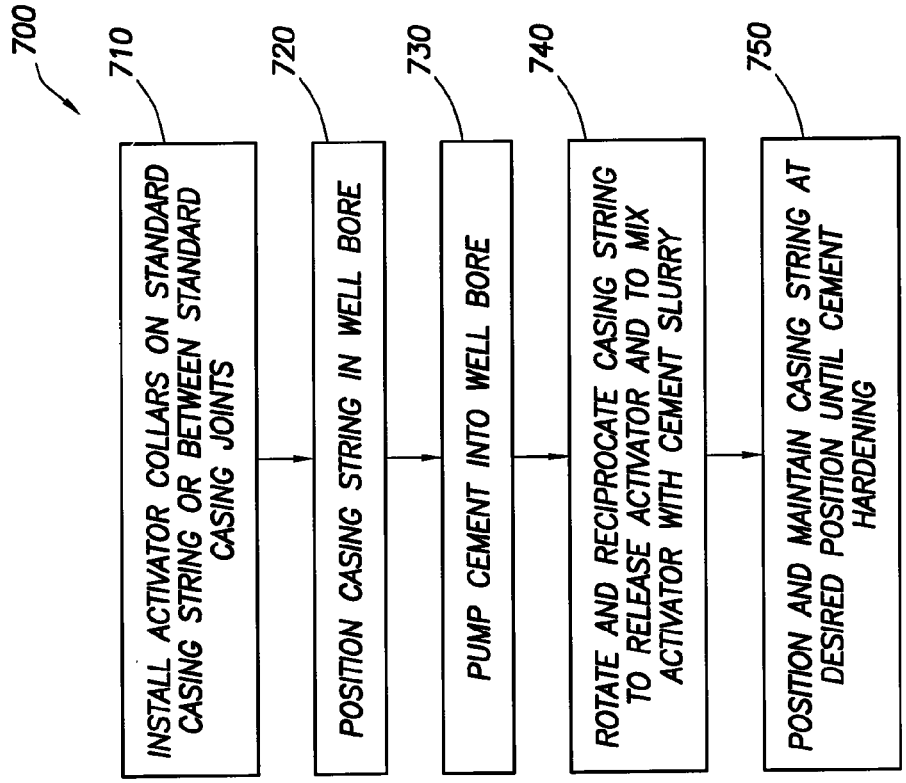
FIG. 7 illustrates a method for bonding a well bore to a casing in accordance with certain embodiments of the present disclosure.

FIG. 7 shows a process flow diagram for an exemplary activation collar running procedure 700. In step 710, activation collars may be installed on standard casing, or collars may be installed between standard casing joints, prior to introducing a cementitious material into the well bore. In step 720, the casing string may be run into the well bore. In step 730, the cement may be introduced into the well bore according to standard procedures. In step 740, the casing string may be rotated and/or reciprocated to release the activator and to mix the activator with the cement slurry. In step 750, the casing string may be placed and maintained in its final position until cement hardening.

Figure 8:
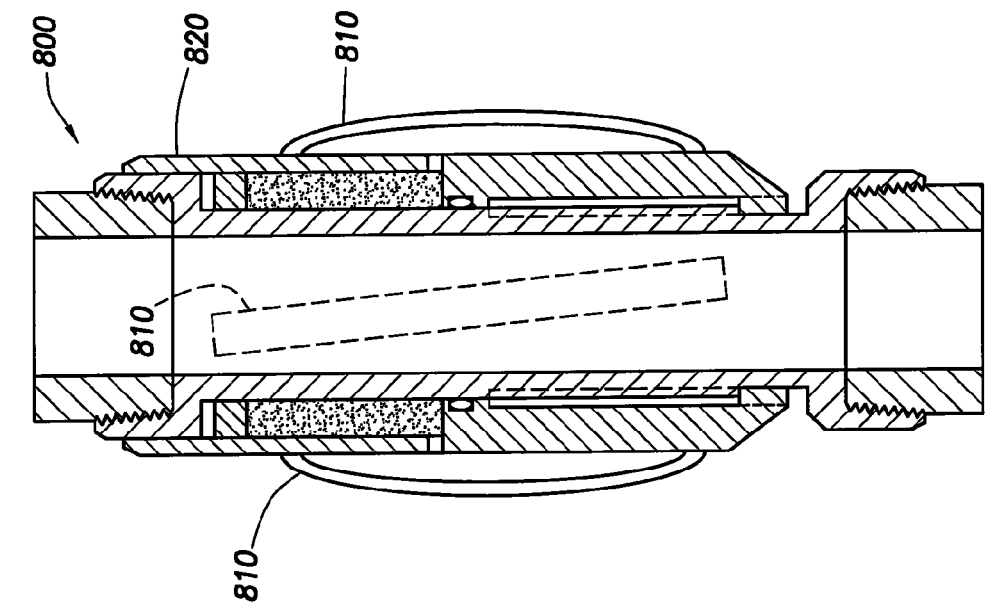
FIG. 8 illustrates a cross-sectional view of casing and a casing collar in accordance with certain embodiments of the present disclosure.

FIG. 8 illustrates a cross-sectional view showing details of an exemplary activation collar 800. Activation collar 800 corresponds to activation collar 600, but alternatively may include one or more centralizer members 810 at an angle with respect to a longitudinal axis of the casing string. Angling of centralizer members 810 may be used to minimize premature actuation of activation collar 800 when centralizer members 810 are in contact with surfaces of the well bore. The orientation and angle of centralizer members 810 may be configured to, in conjunction with surfaces of the well bore, bias outer housing member 820 in the rotational direction that is opposite to the direction which actuates activation collar 800. One of ordinary skill in the art, having the benefit of this disclosure, would understand that various configurations of centralizer members 810 may be employed to optimize the bias of outer housing member 820 and to minimize premature actuation of activation collar 800.

Figure 9A:
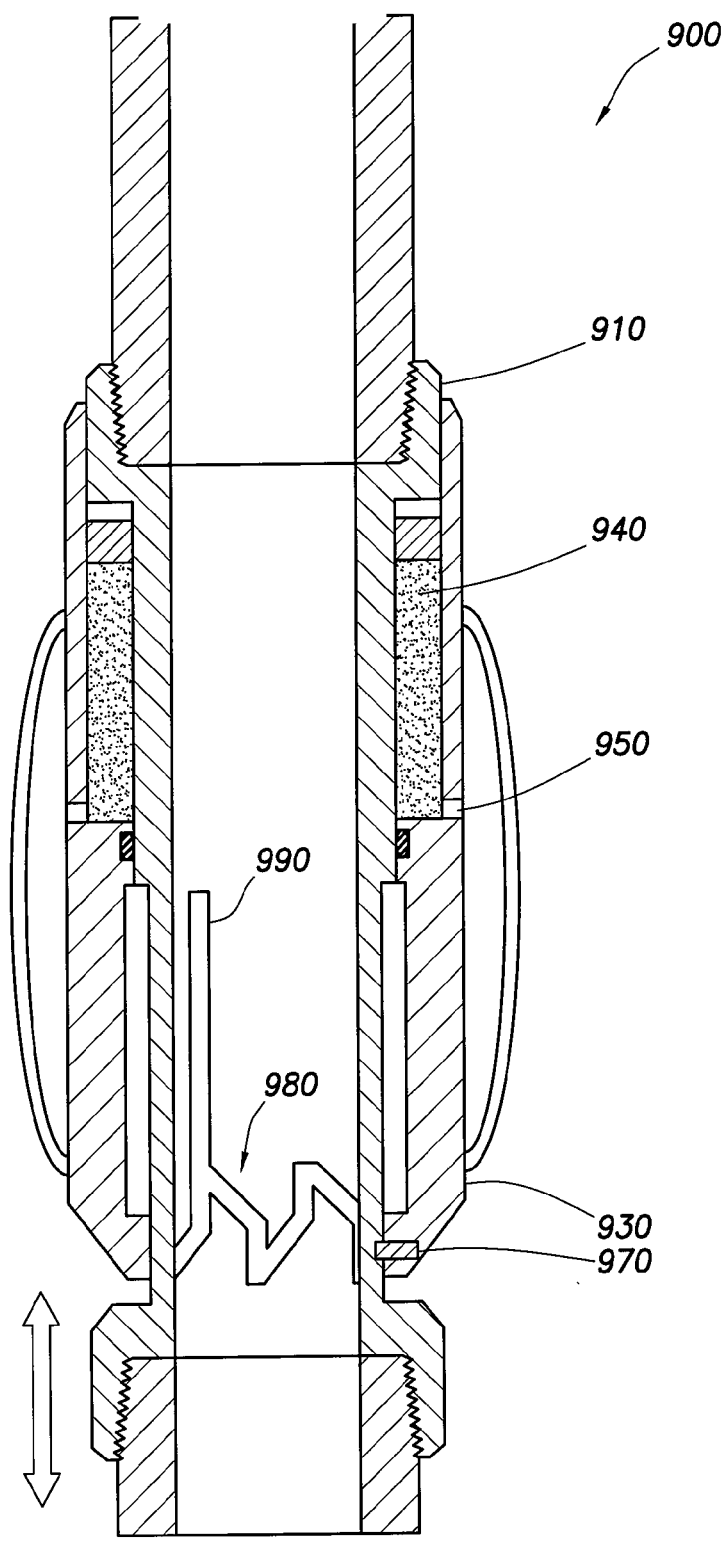
FIGS. 9a and 9b illustrate cross-sectional views of casing and a casing collar in accordance with certain embodiments of the present disclosure.
Figure 9B:
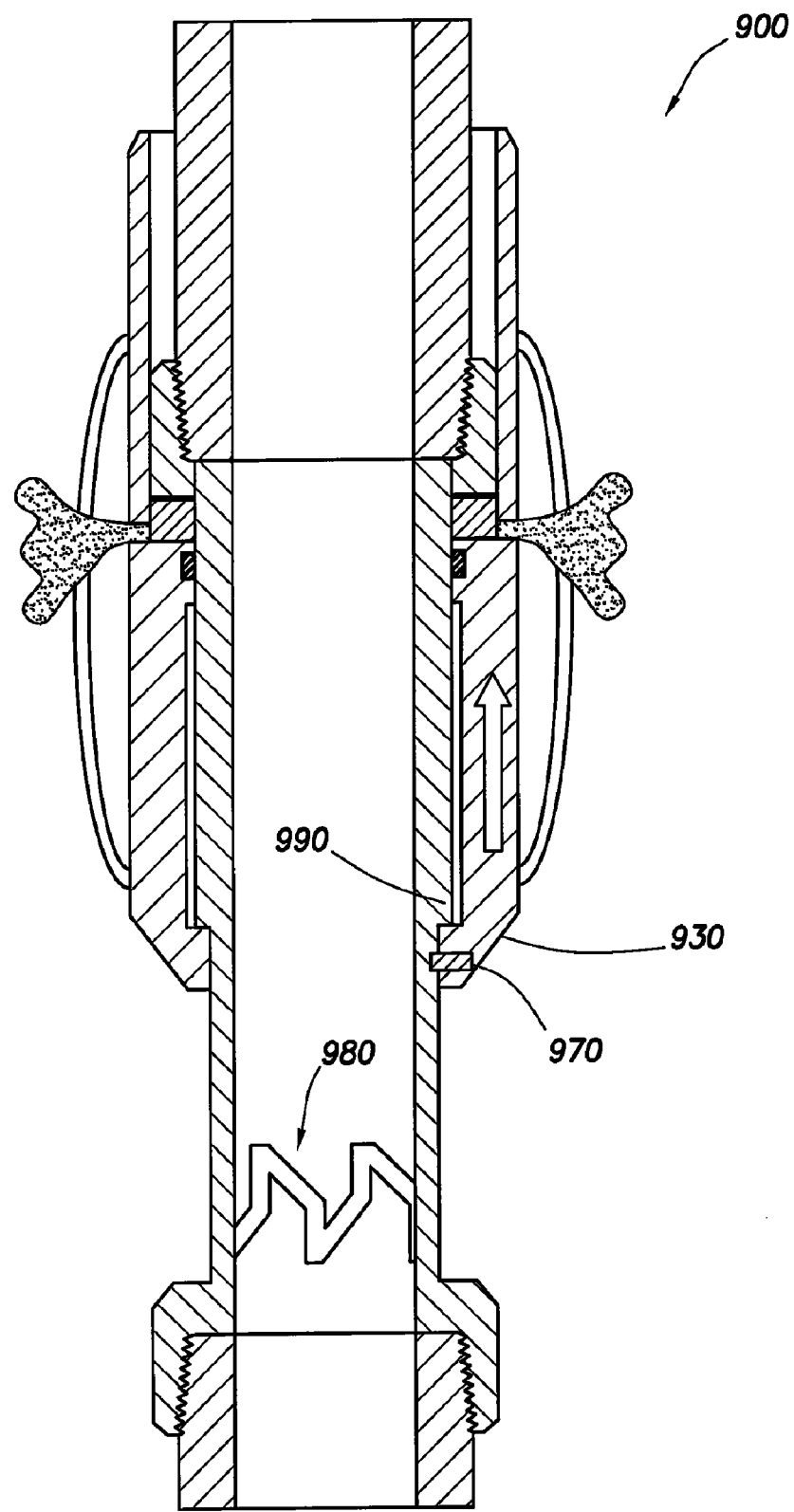

FIGS. 9a and 9b show details of another embodiment of the present disclosure. FIG. 9a illustrates a cross-sectional view showing an exemplary activation collar 900 before activation agent 940 has been expressed through outlet 950 into the annulus. As an alternative to the threaded engagement of activation collar 600, activation collar 900 may include a j-slot or ratchet type release mechanism that may allow reciprocating motion to compress chemical reservoir 940, thereby expressing one or more chemicals into the annulus. Activation collar 900 may include an inner housing member 910 and an outer housing member 930 coupled together at least in part by one or more lugs 970 and a j-slot path 980.

For example, one or more lugs 670 may be attached to outer housing member 930, and inner housing member 910 may include one or more j-slot paths 980. Lug 970 may follow j-slot path 980 as the casing is moved up and down. J-slot path 980 may be configured so that, after a certain number of reciprocation cycles, lug 970 may follow a longer j-slot path section 990 which may allow relative motion between inner housing member 910 and outer housing member 930 to sufficiently compress a volume of chemical reservoir 940. FIG. 9b illustrates activation collar 900 after chemical reservoir 940 has been compressed and one or more chemicals have been expressed through outlet 950 into the annulus.

Thus, in accordance with certain embodiments of the present disclosure, rotationally operated activation collars and methods are provided where "doses" of one or more chemicals and/or an activation agent may be introduced at one or more points along a casing string, without providing a potential leak path from the annulus to an interior diameter of the casing string. The casing string may be reciprocated and/or rotated to facilitate mixing an activation agent with a fluid in the annulus. Certain embodiments of this invention do not require external or internal attachments to casing string for deployment of an activation agent. Certain embodiments allow for activator distribution within an entire cross-section of an annulus containing a cementitious material. The equipment and procedures for certain embodiments are not complex, require minimal modification to existing cementing procedures, and have low operating risks.

FIGS. 10a and 10b shows another exemplary embodiment of the invention. FIG. 10a illustrates straight blade centralizer 1000. FIG. 10b illustrates an axial view of straight blade centralizer 1000. Straight blade centralizer 1000 may be attached to the outside of a casing string in the same manner that a conventional centralizer may be attached to a casing string according to standard practice in the oil and gas industry. Straight blade centralizer 1000 may include one or more collars 1010 that may be generally cylindrical or curved and designed to wrap at least partially around a casing section.

Straight blade centralizer 1000 may further include a plurality of hollow blades 1020 connected to the one or more collars 1010. Each hollow blade 1020 may form a substantially complete enclosure of around a hollow space. Alternatively, each hollow blade 1020 may form only a partially covered hollow space. For example, a hollow space may be exposed on the interior side of a hollow blade 1020 (i.e., the side closest the longitudinal axis of straight blade centralizer 1000).

Figure 11:
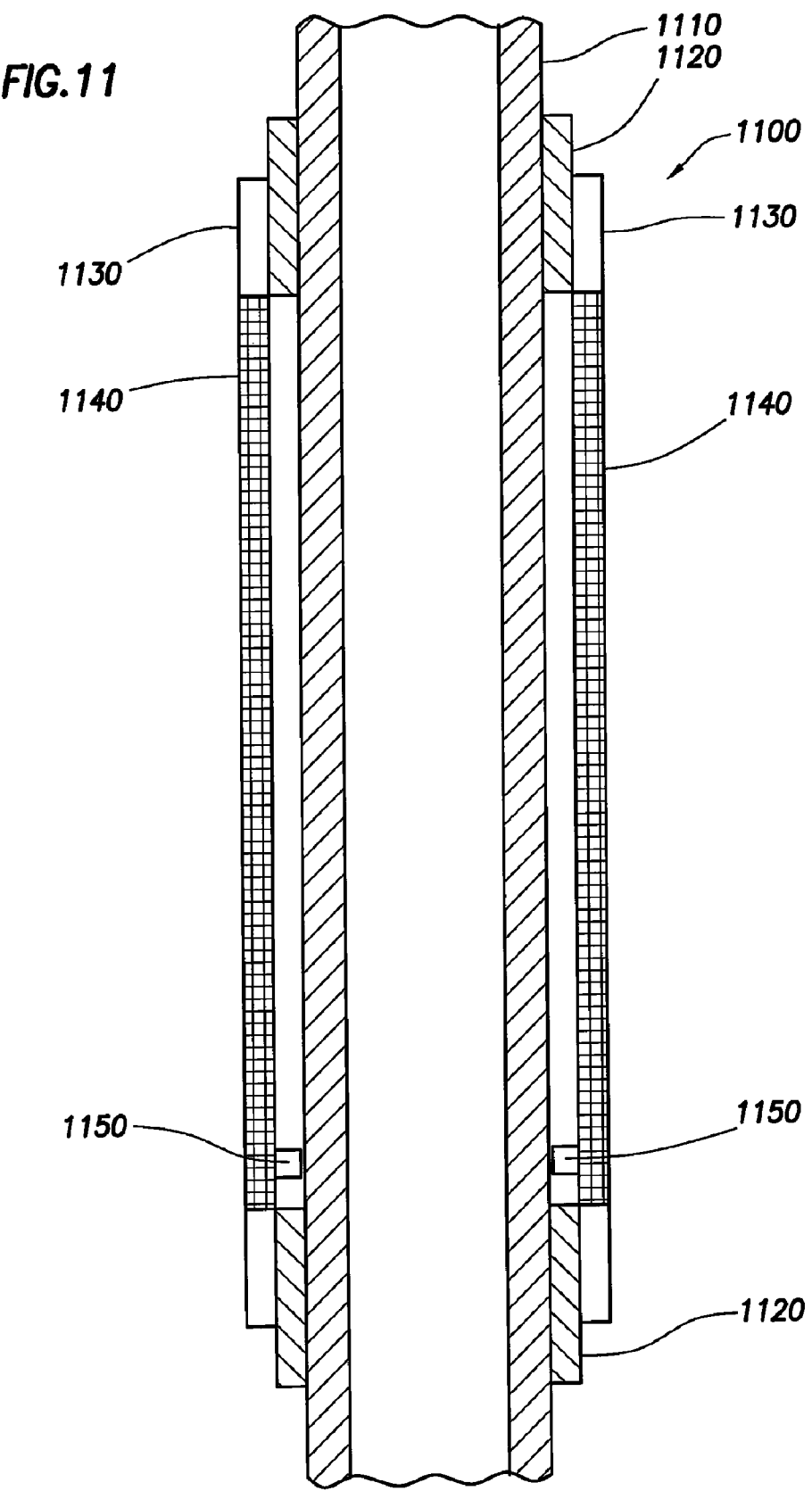
FIG. 11 illustrates a cross-sectional view of casing and a centralizer in accordance with certain embodiments of the present disclosure.

FIG. 11 illustrates a cross-sectional view showing straight blade centralizer 1100, which corresponds to straight blade centralizer 1000 of FIGS. 10a and 10b, coupled to casing 1110. Straight blade centralizer 1100 may include one or more collars 1120 and one or more hollow blades 1130. FIG. 11 depicts two hollow blades 1130, although a different number of hollow blades 1130 may be used. Each hollow blade 1130 may house or cover, at least in part, a chemical container 1140 such as a canister filled with one or more chemicals to be dispensed into the annulus. Chemical containers 1140 may be held inside of hollow blades 1130, or otherwise disposed near an interior surface of hollow blades 1130, as the casing string is lowered into the well bore. This allows chemical containers 1140 to be protected when in the well bore.

The chemical containers or reservoirs may be made of any material such as steel, aluminum, brass, glass, plastic, lead, wood, ceramic or flexible bags. Each chemical container may be pressure balanced with a mechanism known in the art so that the pressure associated with deep well bores will not cause the chemical container to collapse. In the case where the chemical container may include a flexible bag, the chemical container may be inherently pressure balanced by virtue of its flexible design. In certain embodiments, a hollow blade 1130 may itself be the chemical container.

In certain embodiments, each chemical container 1140 may be equipped with a pump 1150 that may be remotely activated to release one or more chemicals at any arbitrary moment. It is to be understood that pump 1150 may be or include a pump, a valve, or any device configured to express, eject, transfer, or otherwise release the chemicals. Pump 1150 may be activated by pressure or pressure pulse from the surface down the annulus. In the alternative, pump 1150 may be activated by lowering a device on slick line or wireline into the interior of the casing that would signal each valve to release chemicals from the chemical container into the annulus as the device passes nearby. This signal could be in the form of acoustic, radioactive, neutron, magnetic, thermal or any other type of signal that would penetrate the steel casing for a short distance. One of ordinary skill in the art, having the benefit of this disclosure, would understand that various configurations could be employed to activate pump 1150. Thus, in accordance with certain embodiments, chemicals in chemical containers 1140 may be dispensed at any point in time.

Figure 12:
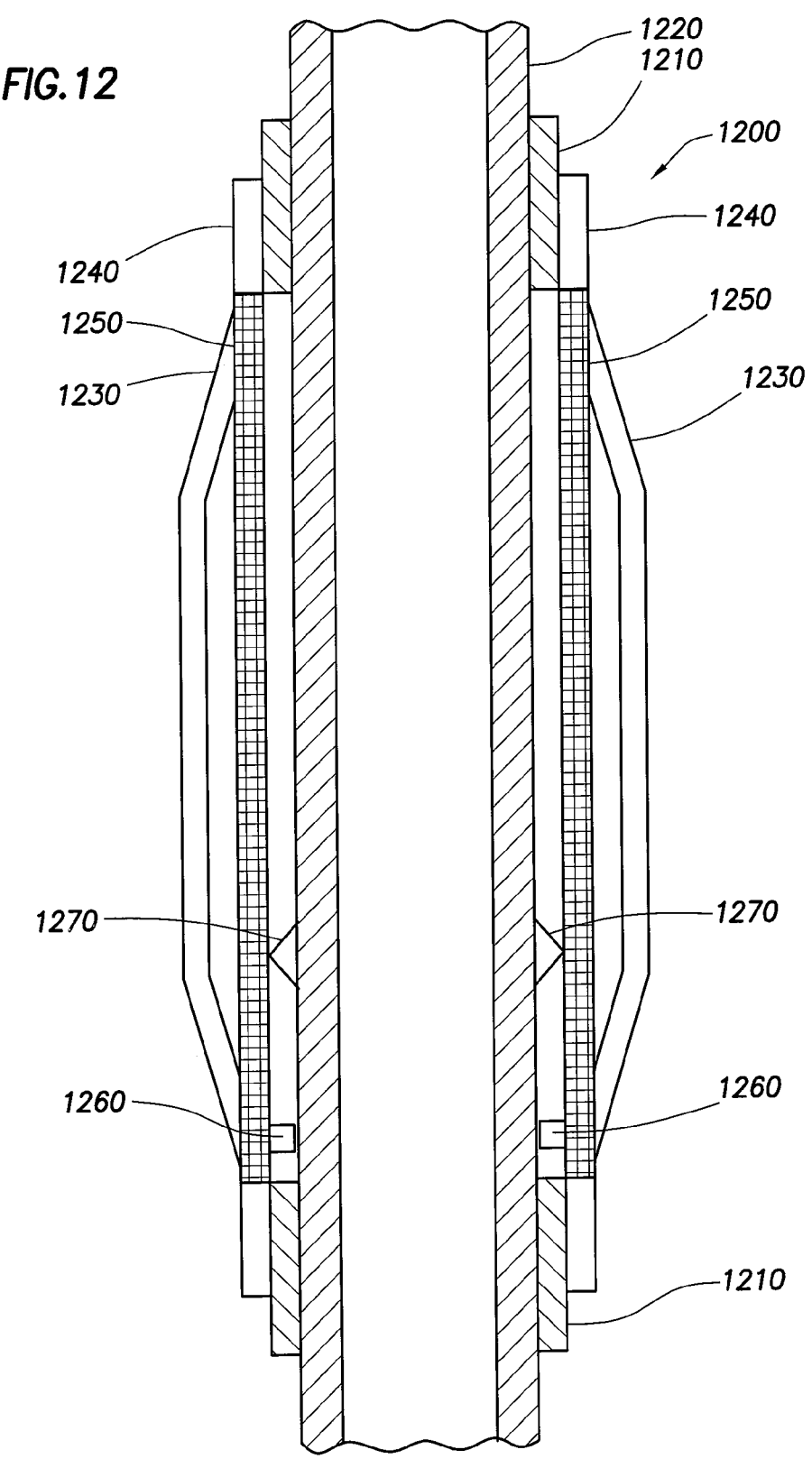
FIG. 12 illustrates a cross-sectional view of casing and a centralizer in accordance with certain embodiments of the present disclosure.

FIG. 12 illustrates a cross-sectional view showing additional embodiments, where centralizer 1200 may include elements of straight blade centralizer 1100 as well as elements of a bow spring centralizer. Centralizer 1200 may include one or more collars 1210 may be generally cylindrical or curved and designed to wrap at least partially around a casing section 1220. Bowed spring members 1230 may be attached to collars 1210 to allow bowed spring members 1230 to contact surfaces of the well bore when attached to a casing string downhole. Although two bowed spring members are depicted in the example of FIG. 12, it should be understood that certain embodiments may employ one or a different number of bowed spring members. Bowed spring members 1230 may accordingly provide resistance to rotation so that all or part of centralizer 1200 may tend to remain stationary. Collars 1210 may be slidably coupled to casing section 1220 in order to slide freely and allow bowed spring members 1230 to flex when in contact with walls of the well bore. Collars 1210 may be configured to move away from each other to allow such flexure of bowed spring members 1230. One or more hollow blades 1240 may be connected or otherwise coupled to one or the other of collars 1210 so as not to inhibit flexure of bowed spring members 1230. One of ordinary skill in the art, with the benefit of this disclosure, would appreciate that various alternative means of coupling centralizer 1200 to a casing section may be employed. Moreover, in the alternative to a bowed spring member, those of ordinary skill in the art would appreciate that a centralizer 1200 may include one or more of another type of projecting member designed to make contact with a surface of a well bore and may not necessarily be designed to provide a centralizing function.

As with the straight blade centralizer 1000 in FIG. 10, each hollow blade 1240 of centralizer 1200 may form a substantially complete enclosure of around a hollow space. Alternatively, each hollow blade 1240 may form only a partially covered hollow space where, for example, the hollow space may be exposed on the interior side (i.e., the "casing side") of a hollow blade 1240. FIG. 12 depicts two hollow blades 1240, although a different number of hollow blades 1240 may be used. As with the straight blade centralizer 1000 in FIG. 10, each hollow blade 1240 of centralizer 1200 may house or cover, at least in part, a chemical container 1250 such as a canister filled with one or more chemicals to be dispensed into the annulus. Chemical containers 1250 may be held inside of hollow blades 1240, or otherwise disposed near an interior surface of hollow blades 1240, as the casing string is lowered into the well bore.

In certain embodiments, each chemical container 1250 may be equipped with a pump 1260. Pump 1260 may be linked to the casing 1220 in a manner known in the art so that, when casing 1220 is rotated, pump 1260 may be forced open to thereby release one or more chemicals from chemical container 1250, and/or forced to actively express the chemicals from chemical container 1250. In other embodiments, pump 1260 may be alternatively configured for activation with the approaches discussed above with respect to FIG. 11.

In certain alternative embodiments where chemical container 1250 may include a plastic or a flexible bag, a cutting instrument 1270, such as a knife edge, may be coupled to casing 1220 in a manner known in the art. When casing 1220 is rotated, each plastic container or bag may be cut open, thereby releasing the chemical. One of ordinary skill in the art, with the benefit of this disclosure, would appreciate that various alternative means of releasing chemicals from chemical container 1250 may be employed. For example, cutting instrument 1270 may include any means that would cut, tear, lacerate, puncture, penetrate, snag, tear, unseal, or otherwise release one or more chemicals from chemical container 1250.

Figure 13:
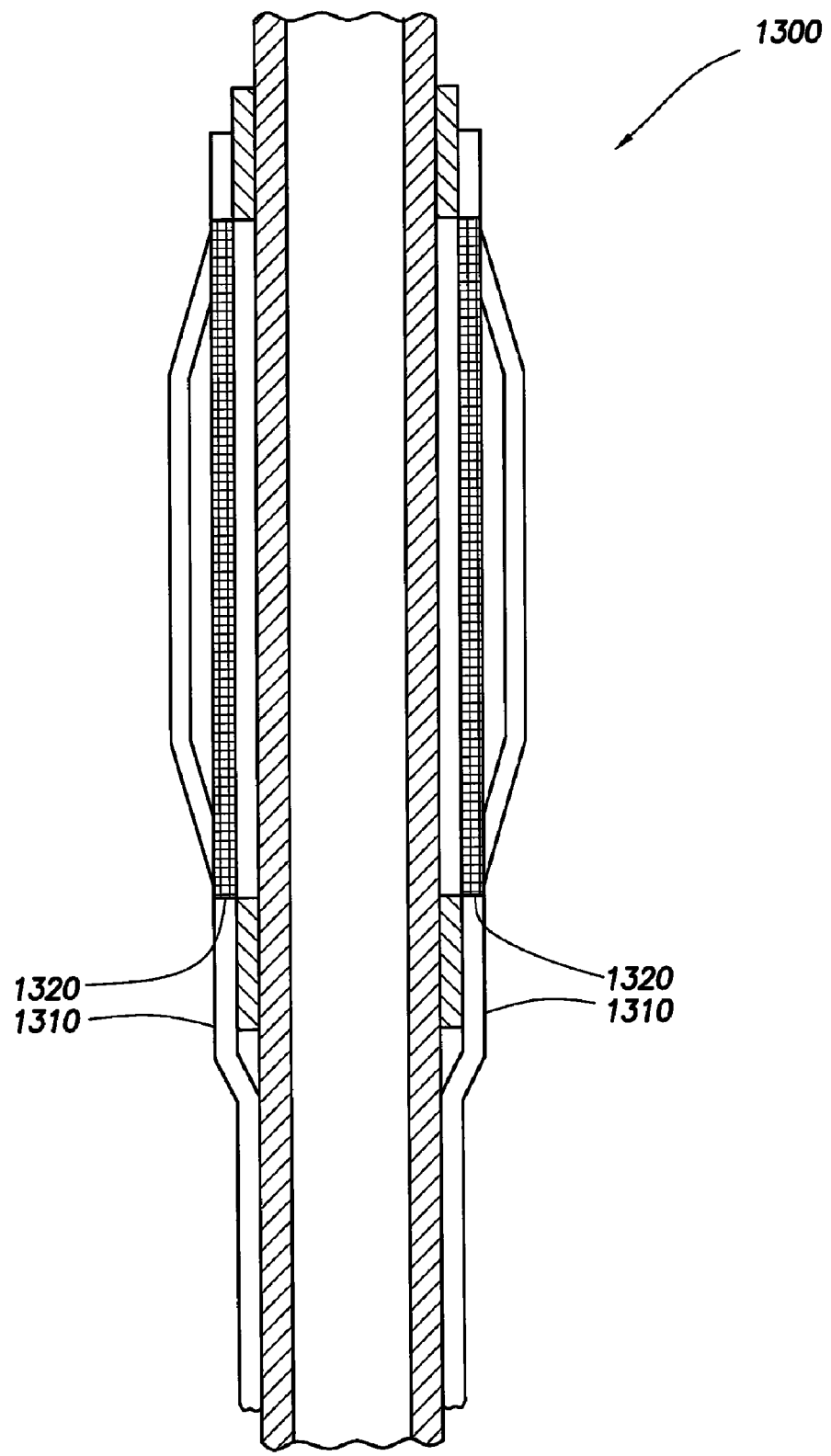
FIG. 13 illustrates a cross-sectional view of casing and a centralizer in accordance with certain embodiments of the present disclosure.

FIG. 13 shows a cross-sectional view illustrating an additional embodiment, where activation collar 1300 may correspond to activation collar 1200, for example, but be configured to include distribution tubes 1310. Distribution tubes 1310 may be coupled to an outlet 1320 of the chemical containers so an activator chemical may be distributed further from an initial point of release. Distribution tubes 1310 may be attached to the casing by straps, clamps, welding or other means as would be understood by one of ordinary skill in the art. Distribution tubes 1310 may include one or more outlets to express the chemical. For example, distribution tube 1310 may be perforated and may be designed to release the chemical in a manner similar to the function of a soaker hose sometimes used in gardening. Distribution tubes 1310 tubes may be of any length desired and may be spiraled around the outside of the casing. Activation collar 1300 may accordingly facilitate activating longer sections of the cement in the annulus.

Thus, in accordance with certain embodiments of the present disclosure, one or more chemicals and/or activating agents may be released into the well bore "on command." The chemicals may be left stagnant and allowed to disperse into the surrounding fluid in the annulus by means of diffusion, or the chemicals may be mixed into the annular fluid by reciprocating or rotating the casing for a period of time as discussed above. As would be appreciated by one of ordinary skill in the art, the blades of the centralizer would provide a means to stir the fluid and mix the chemical in with it. Certain embodiments allow for activator distribution within an entire cross-section of an annulus containing a cementitious material. The equipment and procedures for certain embodiments are not complex, require minimal modification to existing cementing procedures, and have low operating risks.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. An apparatus for releasing a chemical in a well bore, the apparatus comprising:
    a casing collar configured to connect to a section of a casing string; and
    a chemical reservoir disposed between an interior surface and an exterior surface of the casing collar;
    wherein the casing collar is configured to release a chemical from the chemical reservoir;
    wherein the chemical comprises an activation agent; and
    wherein the casing collar comprises an inner casing collar member and an outer casing collar member, wherein the inner casing collar member and the outer casing collar member are configured to compress the chemical reservoir in response to movement of the inner casing collar member relative to the outer casing collar member.

2. The apparatus of claim 1, wherein the casing collar is configured to release the chemical from the chemical reservoir in response to an increase of pressure on an interior surface of the casing string.

3. The apparatus of claim 2, wherein the casing collar comprises a rupture element.

4. The apparatus of claim 2, wherein the casing collar comprises a tension element.

5. The apparatus of claim 2, wherein the casing collar comprises a piston configured to compress the chemical reservoir.

6. The apparatus of claim 1, wherein the movement comprises rotation of the casing collar relative to the section.

7. The apparatus of claim 1, wherein the outer collar member is coupled to the inner casing collar member with a slot assembly, wherein the slot assembly comprises a j-slot and a lug configured to move within the j-slot.

8. The apparatus of claim 1, wherein the casing collar comprises a projecting member configured to extend further from an axis of the casing string than the outer collar member.

9. A method for releasing a chemical in a well bore, comprising the steps of:
    connecting an activator collar between sections of a casing string, the activator collar being generally cylindrical and comprising an interior surface, an exterior surface, and a chemical reservoir disposed therebetween;
    positioning the activator collar and the sections in a well bore;
    introducing a non-activated cementitious material into the well bore; and
    releasing a chemical from the activator collar into the well bore.

10. The method of claim 9, wherein the releasing of the chemical is initiated by increasing pressure on an interior surface of the casing string.

11. The method of claim 9, wherein the releasing of the chemical is initiated by movement of the casing string.

* * * * *